United States Patent
Klev et al.

(10) Patent No.: US 7,455,489 B1
(45) Date of Patent: Nov. 25, 2008

(54) ALL TERRAIN VEHICLE TRANSPORTATION RACK AND METHOD

(75) Inventors: Kurt Klev, Ogden, UT (US); Alan Tebbs, West Haven, UT (US); Jack Hooker, West Haven, UT (US)

(73) Assignee: Ultimate Racks, Limited Company, West Haven, UT (US)

( * ) Notice: Subject to any disclaimer, the term of this patent is extended or adjusted under 35 U.S.C. 154(b) by 398 days.

(21) Appl. No.: 11/271,111

(22) Filed: Nov. 10, 2005

(51) Int. Cl.
*B60P 7/08* (2006.01)
(52) U.S. Cl. .............................................. 410/4; 410/3
(58) Field of Classification Search ............ 410/2, 410/3, 4, 24, 129; 224/403, 404; 211/191; 293/3, 26.09; 414/537, 462
See application file for complete search history.

(56) References Cited

U.S. PATENT DOCUMENTS 6,059,496 A * 5/2000 Stevens .......................... 410/7
6,099,219 A * 8/2000 Bartholomay ................. 410/20

OTHER PUBLICATIONS

Ultimate Racks ATV Carrier Systems, "Ultimate Rack Assembly and Installation Instructions," 2003.

* cited by examiner

Primary Examiner—Stephen Gordon
(74) Attorney, Agent, or Firm—Thorpe North & Western

(57) ABSTRACT

A modular rack for carrying all terrain vehicles (ATV's) above a cargo bed of a vehicle, such as a pick up truck, is assembled by connecting base beams to preferably a pair of vertical frames to hold the vertical frames in spaced apart, parallel configuration. The vertical frames each have a plurality of load bearing posts and preferably load bearing angled trusses extending upwardly from a base rail. Continuous deck beams are connected between the tops of respective posts of the pair of vertical frames. A rigid deck frame is formed by connecting deck rails between the deck beams. At least one, and preferably three deck plates are secured to the deck beams to form a cargo deck configured to support a load, such as one or two ATV's on the cargo deck. The assembled rack is placed in the cargo bed of the vehicle. A cargo drawer can be placed in the cargo area formed between the cargo bed floor of the vehicle and cargo deck of the rack.

15 Claims, 6 Drawing Sheets

ALL TERRAIN VEHICLE TRANSPORTATION RACK AND METHOD

BACKGROUND OF THE INVENTION

1. Field of the Invention

The present invention relates generally to transporting all terrain vehicles, and more particularly to racks for transporting all-terrain vehicles.

2. State of the Art

All-Terrain Vehicles (ATV's) are 3 or 4 wheeled vehicles designed for off road travel. Usually, an ATV must be transported to the location where it will be used off road. This means the ATV must be loaded onto transportation equipment, such as a trailer or pickup truck bed. Pick up truck beds are only big enough to handle a single ATV. Trailers can carry more than one ATV, but trailers restrict maneuverability of the towing vehicle, and such a trailer must be towed in tandem if a camp trailer is also being towed.

Transportation racks for carrying ATV's have been developed that fit in a pickup truck bed and create a deck above the pickup truck bed that is large enough to accommodate two ATV's. The deck is generally supported by posts that extend upwardly from a bottom rail that rest in the truck bed. The deck is supported by these posts. These racks have typically been made of heavy gage steel tubing to accommodate the weight of the ATV's. Most of these racks have been assembled as a single unit using permanent assembly techniques, such as welding, to accommodate the stresses induced in the joints of the rack by the weight of the ATV's and the stresses created by the ATV's on the rack during movement of the truck. A problem with these racks which are made as a single unit is that they are large (fit into the bed of a pick-up truck) and are very difficult and expensive to ship. Therefore, the business of making and selling these racks is essentially a local business selling only to local customers or other customers who can drive their trucks to pick up the rack.

Attempts have been made by the inventor to modularize a rack for carrying ATV's above pickup truck beds to allow for shipping of such racks to distant customers. However, to maintain the strength and stability of such racks, the racks have been broken down into only several large welded components that are then bolted together. An important part of the rack is the deck on which the ATV's are actually supported. The integrity of this deck provides integrity to the entire rack. To maintain the deck and entire rack integrity, the inventor's prior art modular rack included two large welded rectangular deck frame pieces which were bolted to vertical frame pieces providing the upwardly extending posts. Three deck plates were then attached to the deck frame. The large rectangular deck frame pieces established the size of the shipping container needed to ship the rack components to a purchaser. With the large rectangular deck frame pieces, the inventor needed a large wooden crate, that when packed with the rack components, weighed over 400 pounds. While this made shipping possible, it was still very difficult and expensive to ship the rack components. The shipping of this heavy wooden crate usually cost between $250.00 and $350.00. This shipping cost is added to the cost of the rack itself and decreases the competitiveness of the rack in comparison to locally made racks.

SUMMARY OF THE INVENTION

According to the invention, the deck frame of an ATV rack that fits into a pickup truck bed is broken down into a plurality of individual deck beams supported by posts of a vertical frame which rests in and extends upwardly from the bed of the pickup truck. A plurality of deck plates are secured to the deck beams to form an ATV supporting deck. Preferably, two vertical frames are connected in spaced apart configuration by base beams connected between the bottoms of the vertical frames and by the deck beams connected between posts of the spaced vertical frames. End portions of the deck beams extend beyond the posts to cantilever over the truck bed sides. Deck rails are preferably secured to extend between adjacent deck beams to form a rigid deck frame to which the deck plates are then attached. For strength and stability, the vertical frames are still provided as a welded assembly. Each vertical frame preferably include a bottom rail from which a plurality of posts, secured thereto by welding, extend upwardly therefrom. The posts are reinforced by angled trusses welded between a post and the bottom rail. In a short bed embodiment of rack for use with short bed pickup trucks, the vertical frame has three posts and uses three deck beams. In a full bed embodiment for use with full size bed pickup trucks, the vertical frame has four posts and uses four deck beams.

By breaking the deck frame into pieces to be assembled by the user, the inventor has been able to package the frame in two cardboard boxes for shipping. This makes shipping much easier and has significantly reduced the cost of shipping to about $150.00 for the two boxes together. For the short bed embodiment, one box, box A, is 7 inches by 28 inches by 94 inches and weighs 224 pounds. The second box, box B, is 12 inches by 18 inches by 64 inches and weighs 148 pounds. For the full bed embodiment, Box A is 96 inches long rather than the 94 inches. Box B is the same. The full bed rack is actually two feet longer than the short bed rack, but the critical dimension for the packaging for the short bed rack is the length of the deck beams, i.e., the width of the rack, and the critical dimension for the packaging for the full bed rack is the length of the vertical frame, i.e., the length of the rack.

The present invention provides a modular rack to fit into the cargo bed of a pickup truck. The rack is assembled from a plurality of modules or components supplied to a customer or user. The components include at least one, and preferably two, base beams, a preassembled vertical frame, and preferably two preassembled vertical frames, a plurality of deck beams, preferably a plurality of deck rails, a plurality of deck plates, and preferably a preassembled head frame. Each of the preassembled vertical frames has a bottom rail, a plurality of posts welded to the bottom rail and extending upward from the bottom rail, and at least one angled truss coupled between each post and the bottom rail at non-perpendicular angles to stabilize the post and distribute load on the post to the bottom rail. In its preferred form, one base beam is secured to respective ends of two vertical frames with the second base beam secured to respective opposite ends of the vertical frames to secure the bottoms of the vertical frames together in spaced apart relationship. Continuous deck beams are secured to upper ends of corresponding posts of the two vertical frames to secure the tops of the vertical frame together in spaced apart relationship and to secure the deck beams to the tops of the posts. The deck beam are sized and arranged to have end portions extend in cantilever fashion beyond each of the vertical frames. A plurality of top rails are orthogonally secured between adjacent deck beams. A plurality of deck plates are then secured to the deck beams, to form a cargo deck configured to carry at least one all-terrain vehicle.

The connection points for the various modules are configured for easy connection by a user. For example, the base beams have tabs at their ends with bolt holes therethrough that a user aligns with predrilled bolt holes through the ends of the base rails of the vertical frames to correctly position the base beams with respect to the vertical frames. The upper ends of the posts preferably include saddles thereon to easily receive and support the deck rails therein. Predrilled holes in both the saddles and the deck beams are aligned and bolts passed through the aligned holes to correctly position the deck rails with respect to the posts and to provide a secure and rigid attachment. Saddles are also provided along the sides of the deck beams to receive the ends of the deck rails extending between the deck rails. Predrilled holes in both the saddles and the ends of the deck rails are aligned and bolts passed through the aligned holes to correctly position the deck rails with respect to the deck beams and the saddles provide a secure and rigid attachment. Predrilled holes are provided through the front deck beam to be aligned with predrilled holes in the head rack. Bolts passed through the aligned holes attach the head rack to the front deck beam. The only parts not completely predrilled are for attachment of the deck plates. The deck plates are predrilled, but the user has to drill receiving screw holes in the deck beams aligned with the predrilled holes through the deck plates to receive screws that secure the deck plates to the deck beams. However, these screw holes could also be predrilled. The rear deck beam will usually include a ramp bar that supports a loading ramp used to load ATV's onto the rack and several of the deck beams will include ramp tabs extending upwardly therefrom to position loading ramps on the deck beams between the deck plates when stored under the ATV's loaded on the rack.

When installed in a truck bed, the area between the truck bed and the rack deck is open and a user can store items in that area. However, a user has to reach into the truck bed under the rack deck or climb into the bed under the rack deck to retrieve items stored in that area. If desired, an optional feature of the rack of the invention provides a sliding drawer in the area between the truck bed and deck of the rack between the vertical frames of the rack to provide easier access to items stored in this space. With a drawer, the drawer is pulled out so items can be placed in the drawer. During travel, the drawer is positioned in the truck bed below the deck. When access to items in the drawer is desired, the drawer is pulled out to allow easy access to such items. This avoids having to reach or climb into the space between the truck bed and rack deck to retrieve such items.

The present invention also provides for a method for making a rack for carrying an all-terrain vehicle on a pick up truck cargo bed including securing at least one and preferably a pair of base beams preferably orthogonally to at least one and preferably a pair of vertical frames each having a plurality of upwardly extending posts and preferably at least one angled truss associated with each post. Deck beams are attached to the upper end of each post such that each deck beam has cantilever ends extending away from the at least one vertical frame. Deck rails are secured between adjacent deck beams to form a rigid deck frame. Deck plates are then attached to the deck beams to form a cargo deck for supporting ATV's thereon.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

In the accompanying drawings, which show the best mode currently contemplated for carrying out the invention.

DETAILED DESCRIPTION OF THE ILLUSTRATED EMBODIMENTS

Figure 1:
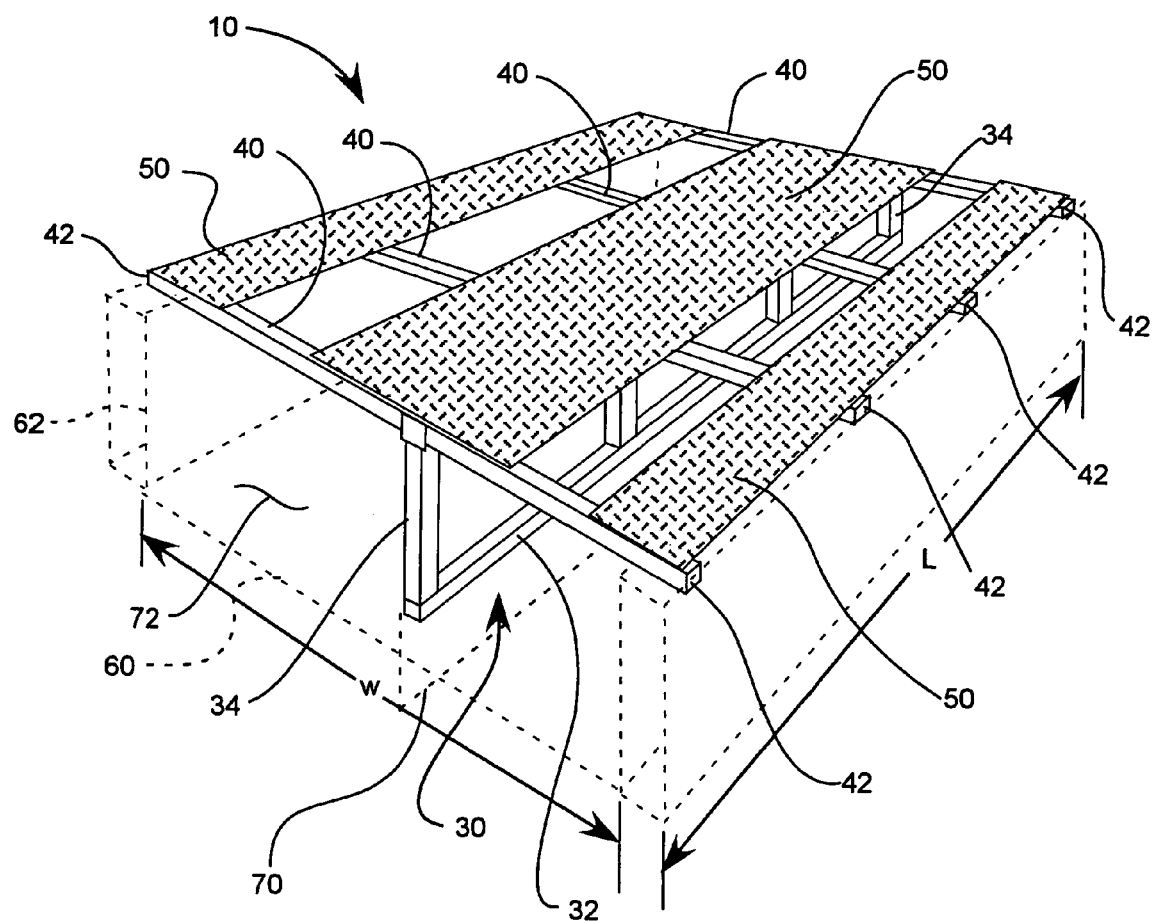
FIG. 1 is a perspective view of a modular rack of an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In its most basic form, the present invention provides a modular transportation rack for All-Terrain Vehicles (ATVs) that fits in the bed of a transportation vehicle, such as a pick up truck, and carries ATV's above the bed of the transportation vehicle. The rack can be shipped unassembled in various separate modules or components that are assembled by the user. A user can assemble the rack by bolting together a preassembled vertical frame and individual deck beams to form a deck frame supported by the vertical frame above the bed of the transportation vehicle. The vertical frame preferably has vertical posts extending upwardly from a base rail that rests on a supporting surface, i.e., the truck bed when the rack is loaded into a truck bed. Deck plates are attached to the deck beams to form a supporting deck for the ATV's. The assembled rack is loaded into and secured in the bed of the transportation vehicle. A loading ramp is positioned to extend from the ground to the rack deck and the ATV's to be carried by the rack are driven up the ramp onto the deck and secured to the rack. The ATV's can then be transported for use at a desired location.

The most basic rack is illustrated in FIG. 1, which shows a modular rack 10 configured to fit into a vehicle, such as a pickup truck, with a cargo bed as shown in broken lines 60. The rack includes several modular components that can be assembled to form the rack 10. The basic modular components, or modules, are at least one preassembled vertical frame 30, a plurality of deck beams 40, and a plurality of deck plates 50. These modules are assembled to form the rack 10.

The vertical frame 30 traverses the longitudinal length, L, of the cargo bed 60. The vertical frame 30 extends upward from the cargo bed 60 in a plane 70 perpendicular to the plane 72 formed by the cargo bed 60. The vertical frame 30 includes a bottom rail 32 that extends along the longitudinal length, L, of the cargo bed 60. A plurality of load bearing members or posts 34 extend upward from the bottom rail 32 the approximate height of the sidewalls 62 of the cargo bed 60. The posts 34 are of sufficient size and strength to carry an applied load.

Each deck beam 40 is secured to the top of an associated load bearing member 34. Each post 34 may be provided with a U-shaped bracket or saddle 38 on its top end which receives a deck beam 40 and in which the deck beam 40 is secured such as by bolts. Each deck beam 40 extends in cantilever fashion from the vertical frame 30 and extends beyond the width W of the cargo bed 60. In the particular basic embodiment shown in FIG. 1, the ends 42 of the deck beams 40 rest on the side walls 62 of the cargo bed 60. Deck plates 50 are connected to deck beams 40 to form a cargo deck to carry one or two All-Terrain Vehicles.

Figure 2:
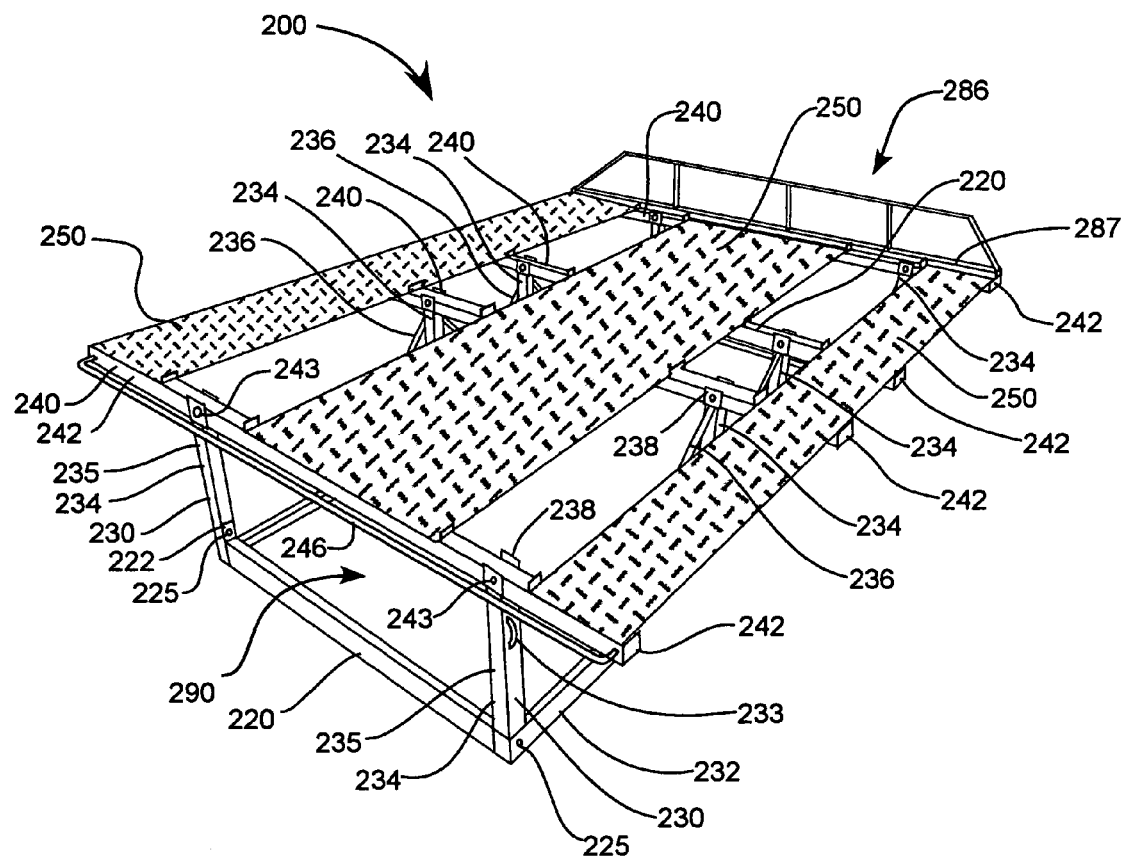
FIG. 2 is a perspective view of a modular rack of another embodiment of the present invention.
Figure 3:
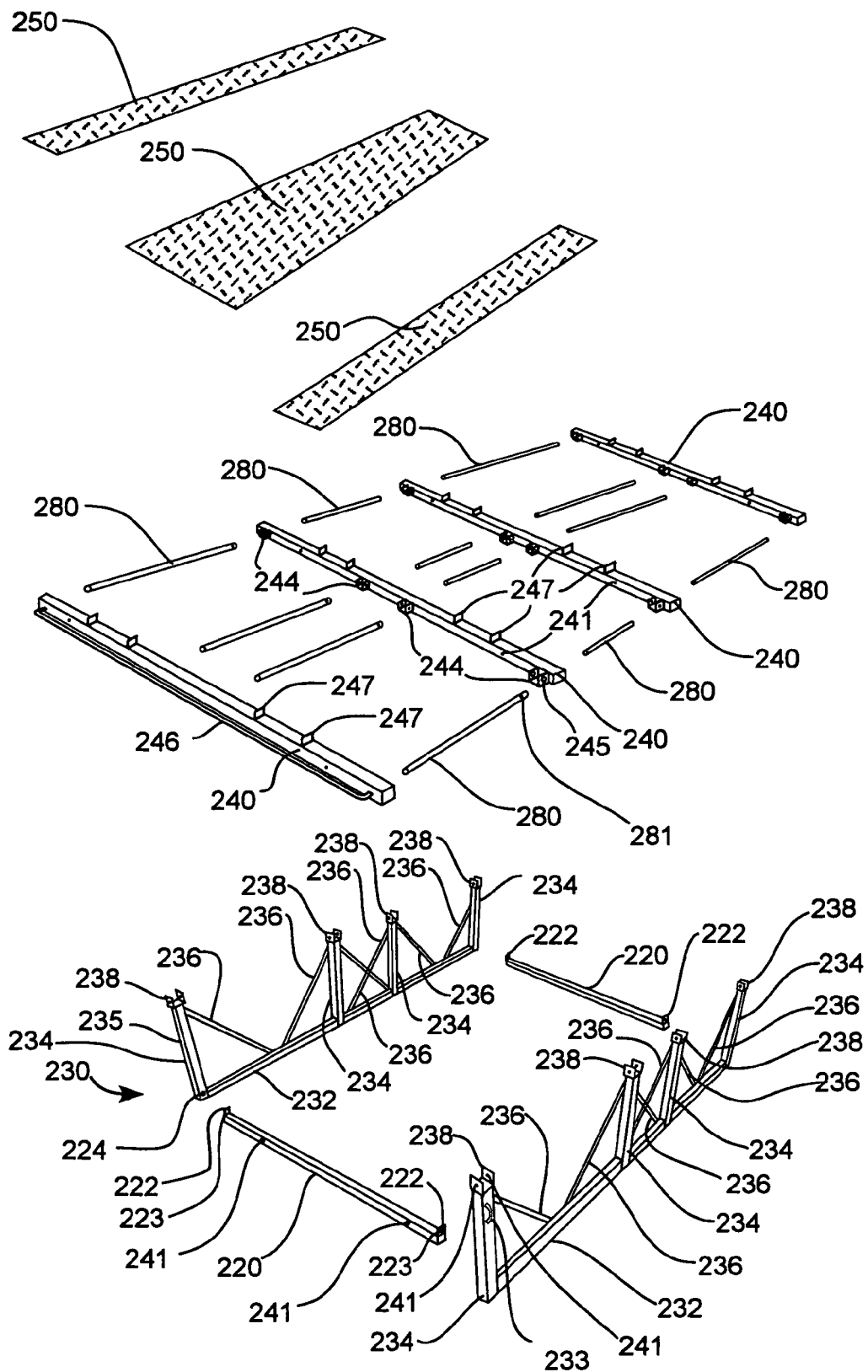
FIG. 3 is an exploded assembly view of the modular rack of FIG. 2.

A preferred embodiment of the modular rack of the invention for use with pickup trucks is illustrated in FIGS. 2 and 3. In the truck industry, there are two standardized sizes of pickup truck beds. One is the full size bed and one is a short bed. The short bed is about two feet shorter than the full size bed. FIGS. 2 and 3 show an embodiment for use in a full size bed. FIG. 2 shows an assembled modular rack 200 ready for loading in a suitable full size pickup truck cargo bed. FIG. 3 is an exploded assembly view of the modular rack 200 of FIG. 2 and shows the individual modules and their orientation with respect to one another.

The modular rack 200 includes two preassembled vertical frames 230 each having a base rail 232 that can be disposed on a support surface and a plurality of posts 234 secured thereto, such as by welding, and extending upwardly therefrom. The two preassembled vertical frames 230 are connected in spaced relationship by base beams 220 connected orthogonally between the ends of respective base rails 232 of the two vertical frames 230. For ease of connection, each base beam has a connecting tab 222 with a hole 223, FIG. 3, therethrough to be aligned with a hole 224 through base rail 232. Bolts 225, FIG. 2, pass through aligned holes 223 and 224 to rigidly connect the bottom ends of the vertical frames 230 together. Tabs 222 are welded to the ends of base beams 220. The base rails 232 and two base beams 220 form a quadrangular foot print when the rack is assembled that rests on the pickup truck cargo bed when loaded into the cargo bed to support the rack.

Each preassembled vertical frame 230 preferably include at least one angled truss 236 attached between each post 234 and the base rail 232 at non-perpendicular angles with respect to the base rail 232 and the posts 234. Each truss 236 stabilizes a corresponding post 234 and receives at least a portion of the load from the upper end 235 of the corresponding post 234 and distributes it to the base rail 232. Advantageously, transferring a portion of the load from the posts 234 to the angled trusses 236 more evenly distributes the load transferred to the base rail 232. It will be appreciated that the base rail 232 can have a smaller size and strength to support a more evenly distributed load than for a series of point loads from the posts 234 alone. It will also be appreciated that transferring a portion of the load from the posts 234 to the angled trusses 236 allows the posts 234 to have a smaller size and strength than a post and lintel support structure without angled trusses. Furthermore, a smaller size post 234 and base rail 232 reduces weight and cost of the rack 200 of the present invention, and also makes the rack 200 easier to handle and ship in an unassembled configuration.

Deck beams 240 are attached to the tops of corresponding posts 234 of each vertical frame 230 to extend orthogonally to the vertical frames and secure the tops of the vertical frames 230 in spaced apart configuration. The spacing of the tops and bottoms of the vertical frames should be substantially equal so that the vertical frames are rigidly held in substantially vertical position when the base rails 232 and base beams 220 rest on a substantially horizontal supporting surface. Further, the spacing is such that the vertical frames are spaced a distance apart approximately equal to the width of the truck bed between the bed side walls so that the vertical frames 230 extend upwardly adjacent the inside of the bed side walls. The posts 234 preferably have U-shaped brackets 238 secured to their top ends to receive deck beams 240. Each U-shaped bracket 238 has a bolt receiving hole 239 therethrough, FIG. 3, while each deck beam 240 has a bolt receiving hole 241 therethrough. In assembling the rack, the deck beams 240 are placed in brackets 238 and the bolt receiving holes 241 in the beams 240 are aligned with bolt receiving holes 239 in the brackets and bolts 243, FIG. 2, are inserted through the aligned holes and tightened to securely attach the beams 240. Use of the U-shaped brackets 238 provide a secure and rigid connection of deck beams 240 between the posts 234. Each deck beam 240 preferably includes cantilever end portions 242 which extend beyond each of the vertical frames 230 to extend the rack deck over the top of the truck bed sides to increase the width of the rack deck beyond the width of the truck bed. This extension over the truck bed sides is shown in FIG. 1 with the truck bed sides indicated by 62 and the width of the truck bed indicated by W.

Each of the plurality of deck beams 240 is preferably a single continuous beam which can support a predetermined load, such as the weight of an ATV or pair of ATV's, without substantial deflection of the center portion of the beam between the vertical frames 230 and the cantilever end portions 242. It will be appreciated that having continuous deck beams 240 more evenly distributes the predetermined load along the deck beam 240 than a beam formed from a plurality of shorter members joined together since joining shorter members together to form the beam results in stress concentrations in the joined ends as well as in the fasteners used to join the members. Advantageously, the evenly distributed loading of the deck beam 240 allows the deck beam 240 to have a smaller size and strength to support the predetermined load than would result from beams made up of a plurality of shorter beam components, and reduces weight and cost of the rack 200. Additionally, the reduced size aids in shipping and handling of the rack 200 in an unassembled configuration.

A plurality of deck rails 280 are attached between adjacent deck beams 240. The deck rails 280 are preferably arranged parallel to the longitudinal direction of the vertical frames 230 and orthogonal to the deck beams 240. Preferably, the ends of the deck rails 280 are received in and secured to U-shaped brackets or saddles 244 secured to the side of deck beams 240. Bolt receiving holes 245 extend through brackets 244 while bolt receiving holes 281 extend through ends of top rails 280. During assembly of the rack, the ends of deck rails 280 are received in brackets 244 with deck rail holes 281 aligning with bracket bolt holes 245. Bolts are extended through the aligned holes and tightened to from a stable and rigid deck frame supported by vertical frames 230. It has been found that brackets 244 welded to deck beams 240 which receive, support, and connect the deck rails to the deck beams provide a secure and rigid connection between the deck rails 280 and the deck beams 240 so that a stable and rigid deck frame is formed of the assembled individual modules or components. A welded deck frame is not necessary to provide stability and rigidity to the rack.

A plurality of deck plates 250 are secured to the deck beams 240. In the embodiment of FIGS. 2 and 3, the deck plates are arranged to form a cargo deck that can carry two all-terrain vehicles in side-by-side configuration. Thus, the two narrower side deck plates are wide enough to receive a tire of an ATV and the wider middle deck plate is of a width to receive the adjacent tires of two ATV's arranged side-by-side. While all holes for bolts previously described are pre-drilled so that all a user has to do during assembly of the modules into the assembled rack is to line up the holes and pass bolts therethrough and tighten the bolts, and such pre-drilling of the holes ensures correct alignment and tight positioning of the modules to provide a stable rack, it has been found that positioning of the deck plates is not as critical and can accurately be done by a user assembling the rack. Further, it has been found preferable to secure the deck plates to the deck beams with screws rather than bolts since screws have flat heads that can be rolled over more easily by the ATV's when the ATV's are loaded onto the rack. Thus, while the mounting holes through the deck plates 250 are preferably predrilled to align correctly with deck beams 240, it has been found that the mounting holes in the deck beams 240 to receive the mounting screws can be easily drilled by a user assembling the rack using the predrilled holes through the deck plates 250 as guides. The user positions the side deck plates by measuring from the ends of the deck beams 240 and positions the center deck plate by centering the center deck plate on the deck frame.

A preassembled head frame 286 with head frame beam 287 is preferably included as a module for the rack and is secured by bolts, not shown, through beam 287 to the front deck beam 240 to extend across the front of the rack. The head frame 286 protects the back cab window 288 of the truck and the back 289 of the cab from being hit by an ATV carried on the rack. The head frame 286 is installed on the front deck beam 240 prior to installing the deck plates 250. The width of the head frame beam 287 is less than the width of the front deck beam 240 so that the head frame only covers about the front half of the deck beam 240. This leaves the rear half of the front deck beam 240 to receive and support the forward ends of deck plates 250 as shown in FIG. 2.

Figure 4:
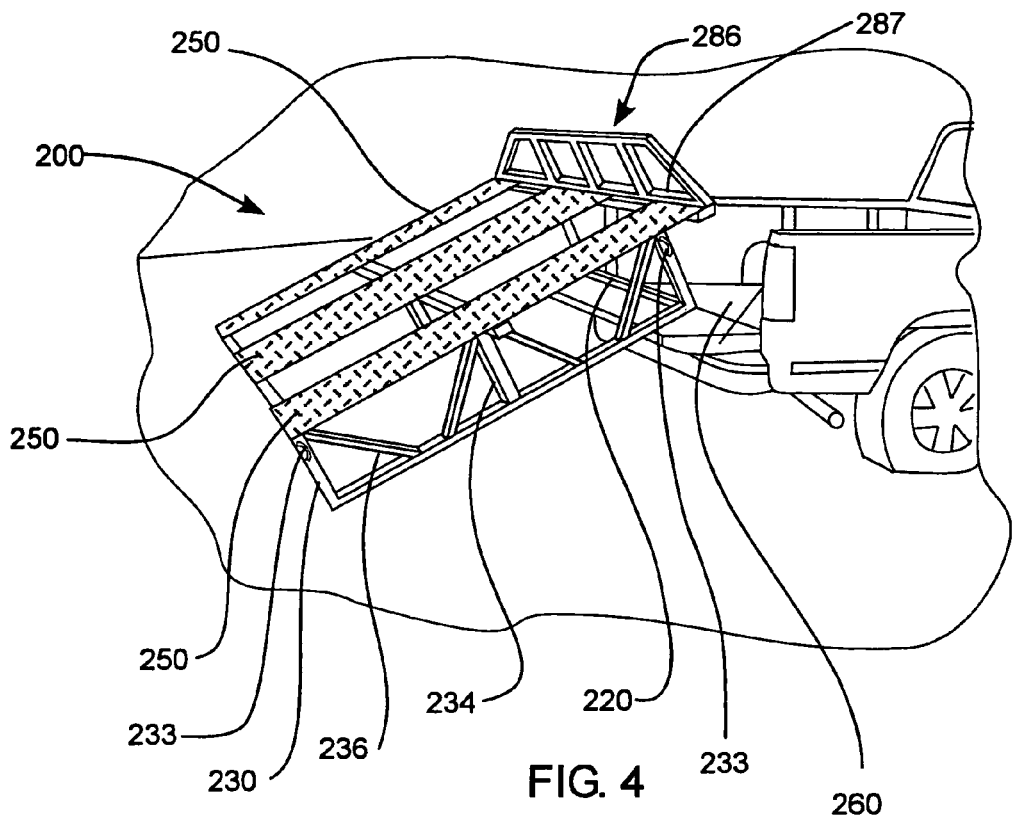
FIG. 4 is a perspective view of the modular rack of FIG. 2 tipped on the cargo space of a vehicle.
Figure 5:
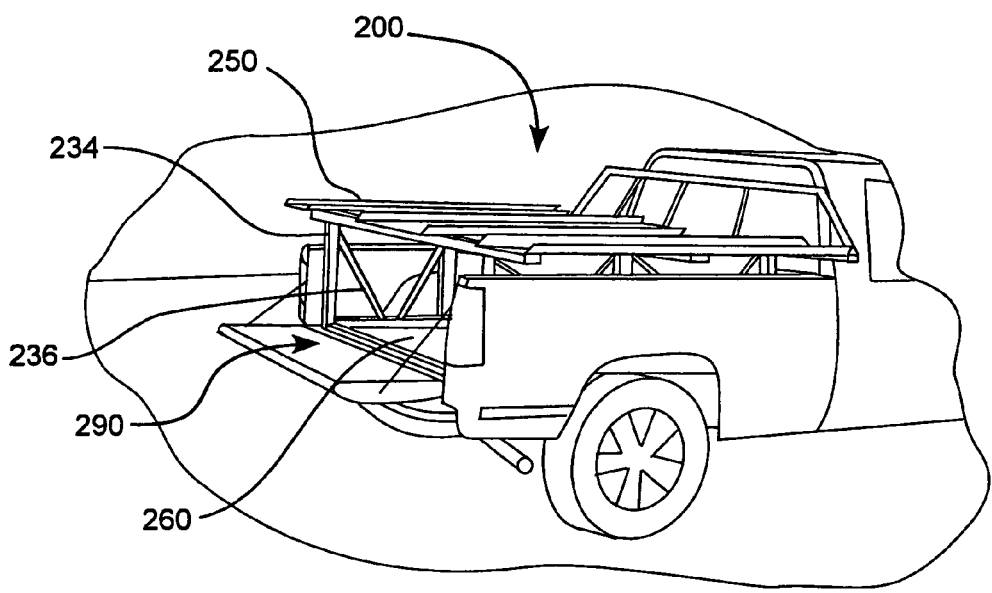
FIG. 5 is a perspective view of the modular rack of FIG. 2 positioned in the cargo space of a vehicle.

The rack of the invention will usually be assembled outside the cargo bed of the truck, but could be assembled directly in a vehicle's cargo bed, if desired. Further, the rack is usually removably positioned in the cargo bed when it is desired to carry ATV's, and removed from the cargo bed when the truck is used for other purposes. Referring to FIG. 4, if a modular rack 200 is assembled outside the cargo bed, the modular rack can easily be moved into the cargo bed by tipping the modular rack onto its rearward end, moving the rear of the truck adjacent the rack, tipping the rack onto the tailgate as shown in FIG. 4, and lifting and sliding the assembled rack 200 until it is positioned fully within and centered in the cargo bed 260, as shown in FIG. 5. The front and rear posts 234 of the respective vertical frames 230 include tie down loops 233 extending outwardly therefrom, FIGS. 2-4. Turnbuckles, not shown, are attached between respective tie down loops 233 and D-rings or other attachment points in the truck bed, not shown, to secured the rack in the truck bed for use. To remove the rack, the turnbuckles are released and the rack is pulled out of the bed, tilted down from the bed and turned on it rear end, the opposite of the steps used to load the rack into the bed.

Figure 6:
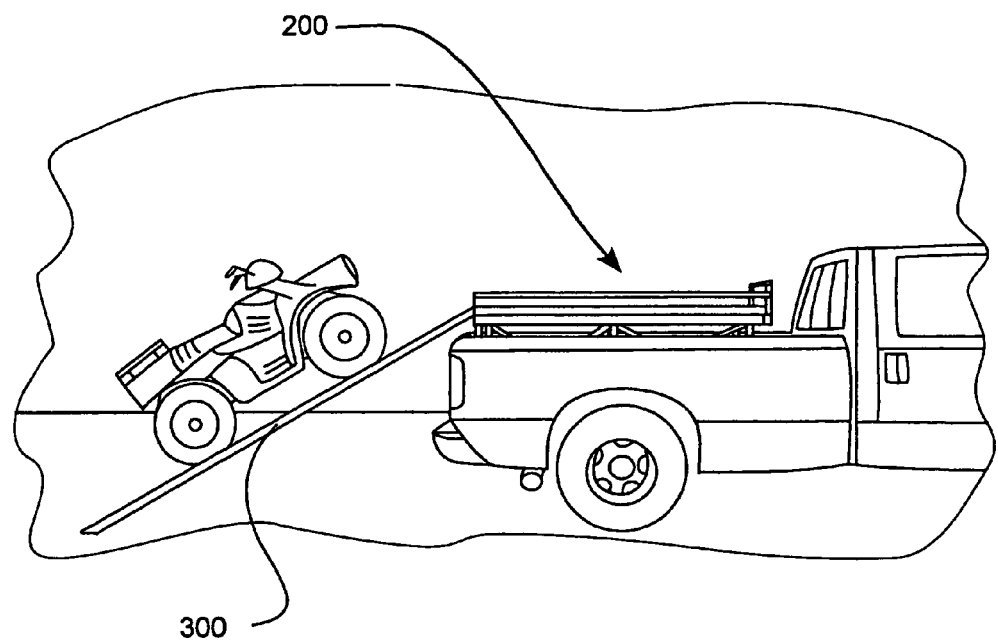
FIG. 6 is a perspective view of an all terrain vehicle being loaded onto the modular rack of FIG. 2.
Figure 7:
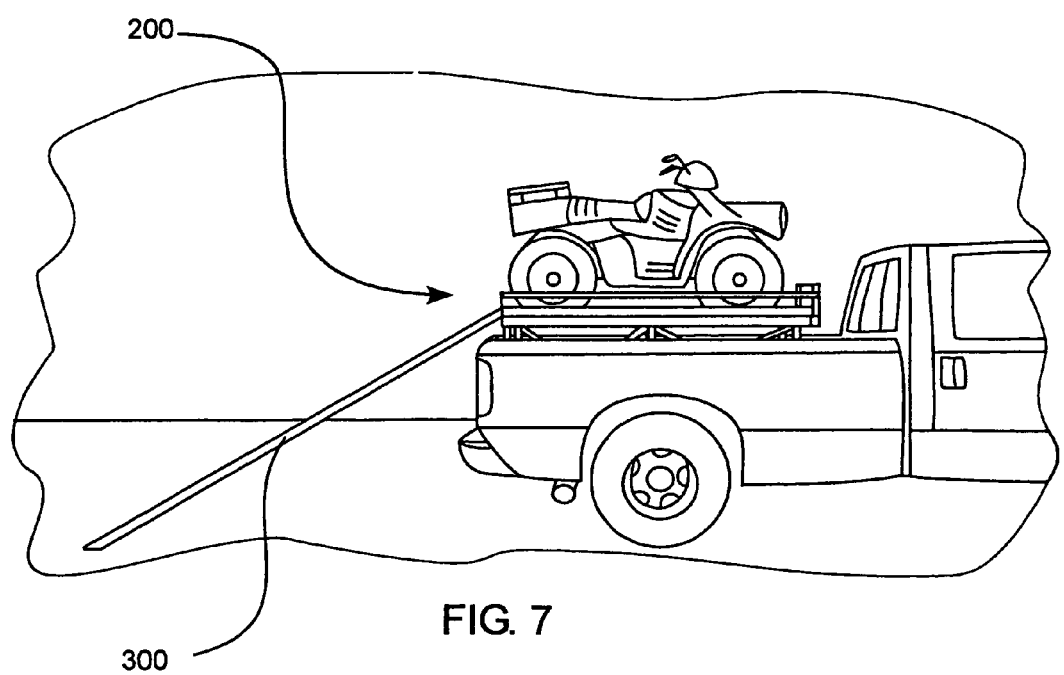
FIG. 7 is a perspective view of an all terrain vehicle positioned on a cargo deck of the modular rack of FIG. 2.

When installed in the truck bed, to load an ATV onto the rack, a pair of ramps 300, FIGS. 6 and 7 are attached to the rear end of the rack adjacent the rack deck. For this purpose, the rear deck beam 240 includes a ramp bar 246, FIGS. 2 and 3, secured, as by welding, to the rear deck beam 240 to extend along the rearward side of the rear deck beam spaced rearwardly therefrom. The upper end of the ramps 300 include hooks which hook over the ramp bar 246 to support the upper ends of the ramps 300 adjacent selected deck plates 250. The lower ends of the ramps 300 rest on the ground or other support surface. An ATV to be loaded onto the rack is driven up the ramp as shown in FIG. 6 onto the deck plates 250 aligned with the ramps, as shown in FIG. 7. The ATV can then be secured in position on the deck plates by straps or other securement means. With the embodiment shown, the ramps are placed adjacent a selected side deck plate 250 and the side of the center deck plate 250 toward the selected side deck plate. When the ATV is loaded, if a second ATV is to be loaded, the ramps 300 are moved to align with the other side deck plate 250 and the side of the center deck plate 250 toward the other side deck plate. The second ATV is then loaded. The ramps 300, which generally fold in the middle to reduce their length for storage purposes, can be stowed in the cargo space 290, FIGS. 2 and 5, between the cargo bed 260 and rack deck, or preferably, on the rack deck underneath the ATV's between the deck plates 250. To position and hold the ramps in position on deck beams 240 between the deck plates 250, positioning tabs 247, FIGS. 2 and 3, are provided to extend upwardly along the rear and middle deck beams 240. One of two ramps is positioned between the positioning tabs 247 on one side of the rack and the other of two ramps is positioned between the positioning tabs 247 on the other side of the rack. A clip or other locking means, not shown, will be provided to lock the ramps in position on the deck and to lock the hooks in position over the ramp bar 246 when in position to load an ATV.

As indicated above, most pickup trucks have either full size beds or short beds. The full size beds are two feet longer than the short beds. The embodiment of rack shown in FIGS. 2 and 3 is adapted to fit in a full bed pickup truck. That embodiment has four posts 234 in each vertical frame which support four deck beams 240. FIGS. 4 and 5 show a short bed embodiment of the rack. The full size bed rack and the short bed rack are essentially the same except that the short bed rack as shown in FIGS. 4 and 5 have only three posts and three deck beams. The three posts and three beams are sufficient to support the shorter deck plates for the short bed rack.

Figure 8:
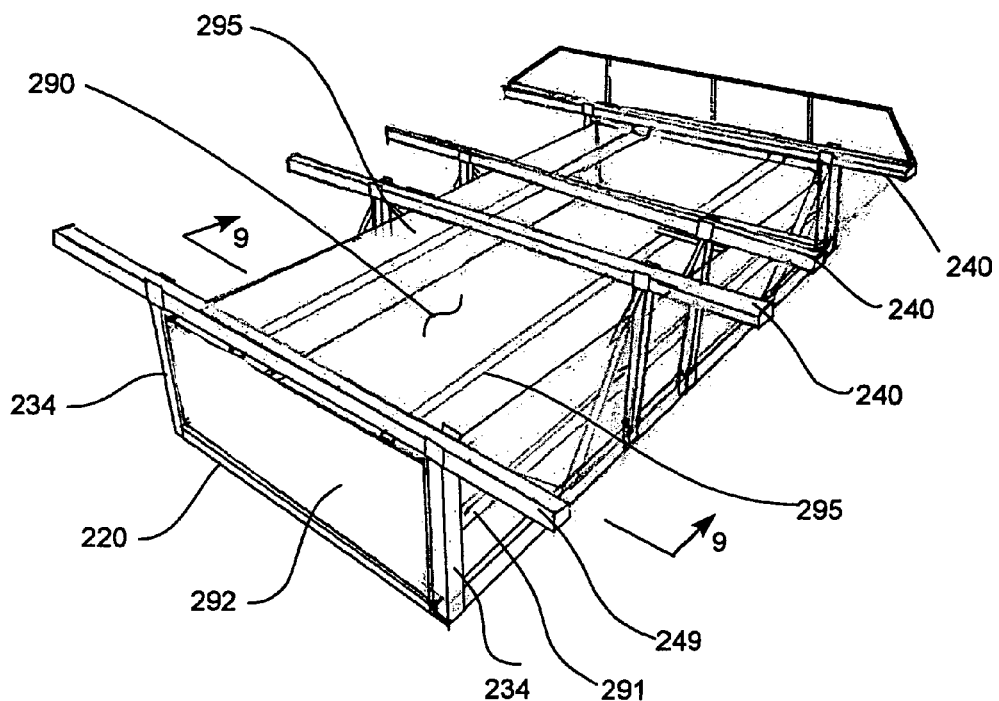
FIG. 8 is a perspective view of a modular rack similar to that of FIG. 2, but not showing the deck plates and showing a sliding cargo drawer.
Figure 9:
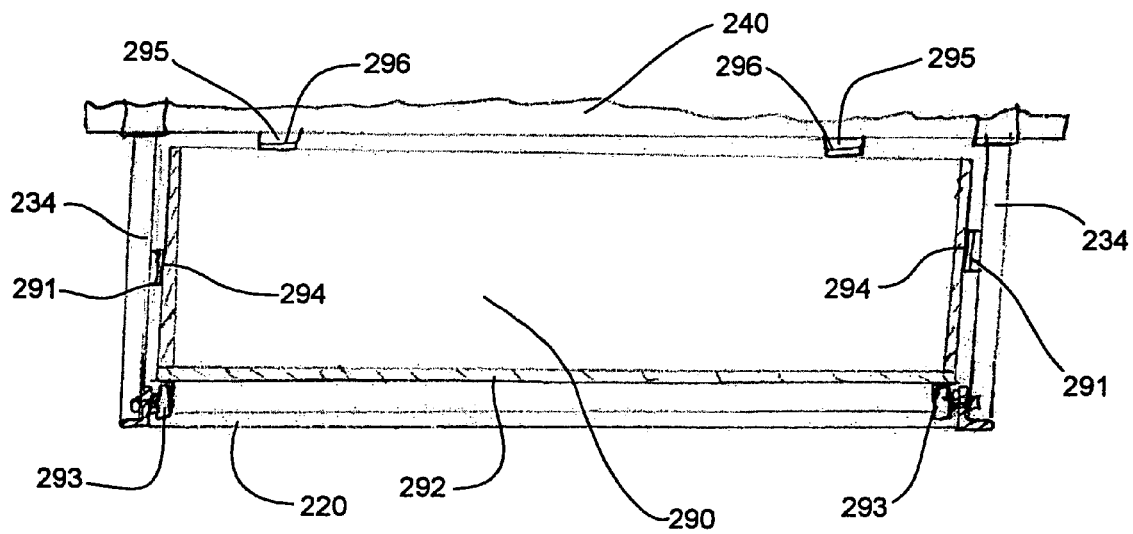
FIG. 9 is a vertical section through the rack of FIG. 8 taken on the line 9-9.

When the rack of the invention is installed in a truck bed, the area 290 between the truck cargo bed and the rack deck is open as a cargo storage space and a user can store items in that area. However, a user has to reach into the truck bed under the rack deck or climb into the bed under the rack deck to retrieve items stored in that area 290. If desired, as an optional feature of the rack of the invention, a sliding storage container or drawer 292, FIGS. 8 and 9, may be provided in the area 290 between the truck bed and deck of the rack between the vertical frames of the rack to provide easier access to items stored in this space. In the embodiment of FIGS. 8 and 9, rollers 293 are secured to vertical frame base rails 232 at intervals along their lengths to support the bottom of the drawer 292 above the base beams 220 so that the drawer 292 can be easily slid in and out of the storage area 290. Side rails 291 with a slick plastic material 294 such as TEFLON or NYLON extend along the length of the rack vertical frames to guide the drawer as it is moved into and out of the area 292 while one or more top rails 295 with a similar slick plastic material 296 guide the top of the drawer so it does not tip downwardly as it is pulled out of the area 290 and so it does not hit deck beams 240. Various other supporting and guiding arrangements for drawer 292 could be used, as desired. With a drawer 292, the drawer is pulled out so items can be placed in the drawer. During travel, the drawer is positioned in the truck bed below the deck and locked in closed position by any suitable means. When access to items in the draw is desired, the drawer is pulled out to allow easy access to such items. This avoids a user having to reach or climb into the space 290 between the truck bed and rack deck to retrieve such items.

The present invention also provides for a method for making a rack for carrying an all-terrain vehicle on a pick up truck cargo bed including coupling at least one base beam orthogonally to at least one vertical frame having a plurality of upward posts and at least one angled truss associated with each post. A continuous deck beam from a plurality of deck beams can be orthogonally coupled to an upper end of each post such that each deck beam has cantilever ends extending away from the at least one vertical frame. A cargo deck can be formed by coupling a plurality of deck plates to the plurality of deck beams.

The method can also include placing the at least one base beam and at least one vertical frame into the cargo bed such that the at least one base beam extends across a width of the cargo bed, and the at least one vertical frame extends along a length of the cargo bed, and the plurality of deck beams cantilever beyond the width of the cargo bed. The base beam and vertical frame can be secured to the cargo bed and ramps can be positioned between the cargo deck and the ground. All terrain vehicles can be driven from the ground, up the ramp and onto the cargo deck. The ATV's can then be secured to the modular rack.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein and comprehended by the claims that follow.

What is claimed is:

1. A modular rack for carrying all terrain vehicles, comprising:
    a) two vertical frames, each of the vertical frames comprising:
        i) a bottom rail, disposable on a support surface; and
        ii) a plurality of posts, each post coupled to the bottom rail and extending upward therefrom substantially perpendicularly to the bottom rail, and configured to support a load on an upper end;
    b) two base beams for connection between the vertical frames to connect lower portions of the vertical frames in spaced apart relationship;
    c) a plurality of continuous deck beams, for connection between upper ends of the plurality of posts of each vertical frame to connect the two vertical frames in spaced apart relationship, and each of the plurality of deck beams having cantilever end portions extending beyond each of the two vertical frames;
    d) a plurality of deck rails for connection between the plurality of continuous deck beams to form, with the deck beams, a rigid deck frame; and
    e) a plurality of deck plates, for connection to the plurality of continuous deck beams to form a cargo deck configured to carry at least one all-terrain vehicle.

2. The rack of claim 1, wherein each vertical frame further includes at least one angled truss coupled between each post and the respective bottom rail at non-perpendicular angles, each truss configured to stabilize the post and to receive at least a portion of the load from the upper end of the corresponding post and distribute the load to the bottom rail.

3. The rack of claim 2, wherein a top of each of the posts includes a receiving cradle for receiving one of the plurality of continuous deck beams therein.

4. The rack of claim 3, wherein each of the plurality of continuous deck beams includes receiving cradles for receiving ends of the deck rails to position and help connect the deck rails between the deck beams.

5. The rack of claim 4, wherein ends of the base beams include mounting tabs thereon with bolt receiving holes therethrough for alignment with bolt holes through each vertical frame to receive bolts therethrough for connecting the base beams to the vertical frames.

6. The rack of claim 5, wherein the bolt holes through each vertical frame extend through ends of the respective bottom rail.

7. The rack of claim 6, wherein the rack has a forward end, and further including a head rack for connection to the forward end of the rack.

8. The rack of claim 7, wherein the rack has a rearward end, and further including a ramp bar at the rearward end for supporting an ATV loading ramp.

9. The rack of claim 1, wherein the rack is removably disposable in a pick up truck cargo bed, further comprising tie down loops secured to the rack for securing the rack in the truck cargo bed when the rack is installed in the cargo bed.

10. The rack of claim 1, wherein a top of each of the posts includes a receiving cradle for receiving one of the plurality of continuous deck beams therein to help connect the deck beam to the post.

11. The rack of claim 1, wherein each of the plurality of continuous deck beams includes receiving cradles for receiving ends of the deck rails to position and help connect the deck rails between the deck beams.

12. The rack of claim 1, wherein ends of the base beams include mounting tabs thereon with bolt receiving holes therethrough for alignment with bolt holes through each vertical frame to receive bolts therethrough for connecting the base beams to the vertical frames.

13. The rack of claim 1, forming a cargo space between the vertical frames below the deck beams.

14. The rack of claim 1, further comprising a storage drawer disposed in a cargo storage space under the deck beams.

15. The rack of claim 14, wherein the storage drawer is supported for movement in and out of the cargo storage space by rollers mounted to the vertical frames.

* * * * *